(12) United States Patent
Brehmer et al.

(10) Patent No.: US 11,852,224 B2
(45) Date of Patent: Dec. 26, 2023

(54) GEAR UNIT FOR AN ELECTRIC DRIVE SYSTEM OF A MOTOR VEHICLE AND ELECTRIC DRIVE SYSTEM WITH SUCH A GEAR UNIT

(71) Applicant: ZF FRIEDRICHSHAFEN AG, Friedrichshafen (DE)

(72) Inventors: Martin Brehmer, Tettnang (DE); Christopher Allnoch, Kressbronn (DE); Markus Laile, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/112,030

(22) Filed: Feb. 21, 2023

(65) Prior Publication Data

US 2023/0265917 A1    Aug. 24, 2023

(30) Foreign Application Priority Data

Feb. 22, 2022    (DE) ...................... 10 2022 201 821.4

(51) Int. Cl.
*F16H 37/08*    (2006.01)
*B60K 17/16*    (2006.01)
(Continued)

(52) U.S. Cl.
CPC ............. *F16H 37/082* (2013.01); *B60K 1/00* (2013.01); *B60K 17/08* (2013.01); *B60K 17/165* (2013.01); *F16H 57/021* (2013.01); *F16H 57/037* (2013.01); *F16H 57/082* (2013.01); *B60K 2001/001* (2013.01);
(Continued)

(58) Field of Classification Search
CPC .... F16H 37/082; F16H 57/021; F16H 57/037; F16H 57/082; F16H 2057/02034; F16H 2057/02052; F16H 2200/0021; F16H 2200/0034; F16H 2200/2005; F16H 2200/2035; B60K 1/00; B60K 17/08; B60K 17/165; B60K 2001/001
See application file for complete search history.

(56) References Cited

U.S. PATENT DOCUMENTS 9,777,816 B2 *  10/2017  Petersen ............. B60L 15/2054
2012/0031691 A1 *  2/2012  Fuechtner ................ B60K 1/00
                                                                  180/65.6

FOREIGN PATENT DOCUMENTS

DE    102017104019 B3 *  3/2018   ............... B60K 1/00
WO    WO 2015082168           6/2015
WO    WO-2018019324 A1 *  2/2018   ............... B60K 1/00

* cited by examiner

*Primary Examiner* — Justin Holmes
(74) *Attorney, Agent, or Firm* — Cozen O'Connor

(57) ABSTRACT

A gear unit for a motor vehicle electric drive system, has a housing with a middle portion and a first and second axial end portions. The middle portion receives an electric machine. A differential gear is arranged in the second end portion of the housing. The differential gear is connected on the drive side to a first planetary gearset and on the driven side to a first output shaft and second output shaft arranged coaxial to one another. The second output shaft is a hollow shaft, and the first output shaft extends into the second output shaft. A first bearing for rotatable support of the second output shaft is arranged radially between the second output shaft and a structural component of the gear unit, and a second bearing for the rotatable support of the two output shafts is arranged between the first output shaft and second output shaft.

16 Claims, 2 Drawing Sheets

(51) Int. Cl.
*F16H 57/08* (2006.01)
*F16H 57/037* (2012.01)
*B60K 1/00* (2006.01)
*F16H 57/021* (2012.01)
*B60K 17/08* (2006.01)
*F16H 57/02* (2012.01)

(52) U.S. Cl.
CPC .............. *F16H 2057/02034* (2013.01); *F16H 2057/02052* (2013.01); *F16H 2200/0021* (2013.01); *F16H 2200/0034* (2013.01); *F16H 2200/2005* (2013.01); *F16H 2200/2035* (2013.01)

GEAR UNIT FOR AN ELECTRIC DRIVE SYSTEM OF A MOTOR VEHICLE AND ELECTRIC DRIVE SYSTEM WITH SUCH A GEAR UNIT

BACKGROUND OF INVENTION

1. Field of the Invention

The disclosure is directed to a gear unit for an electric drive system of a motor vehicle. The gear unit comprises at least a first planetary gearset, a differential gear, a first output shaft, and a second output shaft. The disclosure is further directed to an electric drive system for a motor vehicle with a gear unit and an electric machine which has a stator and a rotor.

2. Description of Related Art

WO 2015/082168 A1 discloses a gear unit having a gear unit input shaft and a gear unit output shaft, a main gearset, an additional gearset, and an electric machine having a rotor and a stator. The gear unit has at least one power path between the gear unit input shaft and the main gearset. The main gearset has a first planetary gearset and a second planetary gearset with a total of four shafts designated in order of speed as first shaft, second shaft, third shaft and fourth shaft. The at least one power path is connectable to at least one of the four shafts of the main gearset via at least one shift element. The third shaft of the main gearset is connected to the gear unit output shaft. The additional shaft has a planetary gearset with a first shaft, second shaft and third shaft. The first shaft of the additional gearset is constantly connected to the rotor. The first planetary gearset of the main gearset is formed as a positive gearset, and the second planetary gearset of the main gearset is formed as a negative gearset. A carrier of the first planetary gearset of the main gearset, a carrier of the second planetary gearset of the main gearset and a carrier of the planetary gearset of the additional gearset are connected to one another. Further, a ring gear of the planetary gearset of the additional gearset and a ring gear of the first planetary gearset of the main gearset are connected to one another. A sun gear of the planetary gearset of the additional gearset meshes with outer planet gears of the first planetary gearset of the main gearset.

SUMMARY OF THE INVENTION

It is the object of one aspect of the invention to provide an alternative gear unit for an electric drive system of a motor vehicle. Further, an electric drive system for a motor vehicle shall also be provided.

A gear unit according to one aspect of the invention for an electric drive system of a motor vehicle comprises a housing with a middle portion, a first axial end portion and second axial end portion. The middle portion of the housing is adapted to receive an electric machine. At least one differential gear is arranged in the area of the second end portion of the housing. The differential gear is operatively connected on the drive side at least to a first planetary gearset and is operatively connected on the driven side to a first output shaft and second output shaft, the two output shafts being arranged coaxial to one another. The second output shaft is at least partially formed as a hollow shaft, and the first output shaft at least partially extends into the second output shaft. An individual first bearing for the rotatable support of the second output shaft is arranged radially between the second output shaft and a structural component of the gear unit which is fixed with respect to relative rotation. At least one second bearing for the rotatable support of the two output shafts is arranged radially between the first output shaft and second output shaft.

Consequently, the first bearing contacts an inner circumferential surface of the structural component of the gear unit, which is fixed with respect to relative rotation on one side and contacts an outer circumferential surface of the second output shaft on the other side. In contrast, the second bearing contacts an inner circumferential surface of the second output shaft on one side and an outer circumferential surface of the first output shaft on the other side.

Only one individual bearing, namely, the first bearing, is provided for the rotatable support of the second output shaft relative to the structural component of the gear unit fixed with respect to relative rotation and preferably formed as a housing cover. According to a preferred aspect of the invention, the first bearing is formed as a ball bearing. The ball bearing has at least one inner race arranged at the second output shaft, an outer race arranged at the structural component of the gear unit fixed with respect to relative rotation, and spherical rolling elements that roll between the inner race and the outer race. Optionally, a cage can be provided for guiding the rolling elements. In particular, the first bearing is formed as a grooved ball bearing.

At least one bearing, namely, the second bearing, is provided for the rotatable support of the first output shaft relative to the second output shaft. The first output shaft and the second output shaft have a differential speed with respect to one another only in certain cases, for example, when cornering. According to a preferred aspect of the invention, the second bearing is formed either as a rolling element bearing or as a plain bearing. The rolling element bearing has at least one inner race arranged at the first output shaft, an outer race which is arranged at the second output shaft, and rolling elements which roll between the inner race and the outer race. Optionally, a cage can be provided for guiding the rolling elements. In particular, the second bearing is formed as a needle roller bearing or needle cage or as a cylindrical roller bearing. At least one or both running surfaces for the rolling elements is/are formed directly at one or both output shafts. When the second bearing is formed as a radial plain bearing, installation space and weight can be saved in particular. The lubrication of the plain bearing should be adapted relative to the rolling element bearing.

The middle portion of the housing is arranged axially between the first axial end portion of the housing and the second axial end portion of the housing. In particular, a respective housing cover which is connected to the housing so as to be fixed with respect to rotation relative to it is arranged at the respective axial end portion of the housing.

An operative connection between the differential gear and the at least first planetary gearset means that the differential gear is connected either directly to the first planetary gearset or at least indirectly to the first planetary gearset via a plurality of shafts, particularly via further planetary gearsets. Consequently, at least one further planetary gearset can be arranged in the power flow between the differential gear and the first planetary gearset. Further, an operative connection between the first output shaft and second output shaft and the differential gear means that the respective output shaft is either directly connected to or in meshing engagement with a shaft or an element of the differential gear, or at least a further shaft or a further element is arranged between the respective output shaft and the shaft or the element of the differential gear. The respective output shaft is preferably operatively connected to a wheel of a drive axle of the motor vehicle.

Within the meaning of one aspect of the invention, a "shaft" shall be understood to mean a rotatable structural component part of the gear unit via that associated components of the gear unit are connected to one another so as to be fixed with respect to relative rotation or via which such a connection is produced when a corresponding shift element is actuated. The shaft can be formed, for example, as a toothed wheel, ring gear, sun gear or planet carrier.

The electric machine is formed as an electric motor and comprises a stator and a rotor. Propulsive power is generated via the rotor and a rotor shaft connected thereto so as to be fixed with respect to relative rotation and is introduced into the gear unit or into the rotationally movable gear unit components. In particular, the electric machine is part of the gear unit and is arranged in a common housing together with the at least first planetary gearset and the differential gear.

A second output shaft at least partially formed as a hollow shaft shall be understood to mean that the second output shaft is formed in its entirety or only partially as a hollow shaft, i.e., in a tubular manner. The first output shaft extends partially into the region of the second output shaft formed as hollow shaft. The second bearing is arranged radially between the first output shaft and second output shaft in the region of the second output shaft formed as hollow shaft.

According to a preferred aspect of the invention, at least a third bearing is arranged radially between the first output shaft and second output shaft for the rotatable support of the two output shafts. The first output shaft and second output shaft have a differential speed with respect to one another only in certain cases, for example, during cornering of the motor vehicle. According to this embodiment form, at least two bearings, particularly exactly two bearings, namely, the second bearing and third bearing, are provided for the rotatable support of the two output shafts, the two bearings being arranged radially between the first output shaft and second output shaft. According to a preferred aspect of the invention, the third bearing is formed either as a rolling element bearing or as a plain bearing. The rolling element bearing has at least one inner race which is arranged at the first output shaft, an outer race which is arranged at the second output shaft, and rolling elements which roll between the inner race and the outer race. Optionally, a cage can be provided for guiding the rolling elements. In particular, the second bearing is formed as a needle roller bearing or needle cage or as a cylindrical roller bearing. At least one running surface or both running surfaces for the rolling elements is or are formed directly at one or both output shafts. When the third bearing is constructed as a radial plain bearing, installation space and weight can be saved in particular. The lubrication of the plain bearing should be adapted relative to the rolling element bearing.

The first bearing is arranged, for example, in an area axially inside of the second bearing and third bearing. In other words, the first bearing is either arranged with the second bearing on a common first axis formed orthogonal to a rotational axis of the two output shafts, or is arranged with the third bearing on a common second axis which is formed orthogonal to a rotational axis of the two output shafts, or is arranged in any position between the first axis and second axis. The axial distance between the second bearing and third bearing is the bearing base. The greater the length of the bearing base, the smaller a radial force component acting on the first bearing. Accordingly, a force distribution on the three bearings can be influenced by adjusting the length of the bearing base.

According to a further aspect of the invention, the first output shaft is at least partially formed as a hollow shaft. A bearing journal extends at least partially into the first output shaft and at least partially into the second output shaft. At least one third bearing for the rotatable support of the first output shafts is arranged radially between the first output shaft and the bearing journal. The bearing journal is connected to the second output shaft so as to be fixed with respect to rotation relative to it. A first output shaft formed at least partially as a hollow shaft means that the first output shaft is formed either in its entirety or only partially as a hollow shaft, i.e., in a tubular manner. By "bearing journal" is meant a shaft, particularly a cylindrical element, which is preferably formed from solid material or, alternatively, in a tubular manner, i.e., as a hollow shaft.

The bearing journal extends partially into the region of the first output shaft formed as hollow shaft on one hand and partially into the region of the second output shaft formed as hollow shaft on the other hand. In the region of the first output shaft formed as hollow shaft, the third bearing is arranged radially between the first output shaft and the bearing journal. Consequently, the third bearing comes in contact with an outer circumferential surface of the bearing journal and an inner circumferential surface of the first output shaft. Because the bearing journal is connected to the second output shaft so as to be fixed with respect to rotation relative to it, the bearing journal always rotates at the same speed as the second output shaft. The bearing journal has a differential speed with respect to the first output shaft only in certain cases, for example, when the motor vehicle is cornering. According to one aspect of the invention, the third bearing is formed either as a rolling element bearing or as a plain bearing. The rolling element bearing has at least one inner race arranged at the bearing journal, an outer race which is arranged at the first output shaft, and rolling elements which roll between the inner race and the outer race. Optionally, a cage can be provided for guiding the rolling elements. In particular, the third bearing is formed as a needle roller bearing or needle cage or as a cylindrical roller bearing. At least one or both running surfaces for the rolling elements is/are formed directly at the bearing journal and/or at the first output shaft. When the third bearing is formed as a radial plain bearing, installation space and weight can be saved in particular. The lubrication of the plain bearing should be adapted relative to the rolling element bearing.

For example, the first bearing and second bearing are arranged to be radially stacked, the third bearing being arranged in a region of the bearing journal axially outside of the first bearing and second bearing. In other words, the first bearing and second bearing are arranged on a common axis, this axis being formed orthogonal to a rotational axis of the two output shafts. In contrast, the third bearing is not arranged on this common access but rather axially offset relative to it. The axial distance between the axis on which the first bearing and second bearing are jointly arranged and the third bearing is the bearing base. The greater the length of the bearing base, the smaller a radial force component acting on the first bearing and second bearing. Accordingly, a force distribution on the three bearings can be influenced by adjusting the length of the bearing base.

The third bearing is preferably arranged at an end region of the bearing journal. The bearing base is maximized in this way, and the radial force component which acts on the first bearing and the second bearing is minimized. In particular, the third bearing is arranged at the end region of the bearing journal in a groove provided for this purpose at the bearing journal.

According to one aspect of the invention, the structural component of the gear unit fixed with respect to relative rotation is formed as housing cover. The housing cover is connected, in particular screwed, to the housing of the gear unit so as to be fixed with respect to rotation relative to it. The housing cover preferably extends in the area of the second end portion of the housing in such a way that the entire differential gear is arranged inside of the housing cover.

The differential gear preferably has a sun gear, a ring gear, a first planet carrier, a second planet carrier and an intermediate gear. The sun gear is adapted to introduce a propulsive power from the electric machine into the differential gear. The first planet carrier is connected to the first output shaft so as to be fixed with respect to rotation relative to it, the second planet carrier is connected to co-rotate with a structural component of the gear unit that is fixed with respect to relative rotation. The ring gear is connected to the second output shaft so as to be fixed with respect to rotation relative to it. In particular, the intermediate gear is formed as a ring gear sun and has a first toothing at an inner circumferential surface which serves as a ring gear for the planet gears at the first planet carrier. The ring gear sun has a second toothing at an outer circumferential side which serves as sun gear for the planet gears at the second planet carrier. Consequently, the respective planet gears at the first planet carrier and second planet carrier mesh with the intermediate gear or with the ring gear sun. In particular, the planet gears at the first planet carrier and the planet gears at the second planet carrier are arranged radially one above the other.

A fourth bearing for the rotatable support of the second output shaft relative to the first planet carrier is preferably arranged axially between the second output shaft and the first planet carrier. Consequently, the fourth bearing comes in contact with the first planet carrier on the one hand and with the second output shaft on the other hand. According to one aspect of the invention, the fourth bearing is formed either as rolling element bearing or as plain bearing. In particular, the fourth bearing is formed as a needle roller bearing or needle cage or as a cylindrical roller bearing. At least one or both running surfaces for the rolling elements is or are formed directly at the second output shaft and/or at the first planet carrier. By constructing the fourth bearing as an axial plain bearing, installation space and weight can be saved in particular. The lubrication of the plain bearing should be adapted relative to the rolling element bearing.

According to a preferred aspect of the invention, a first shift element and second shift element and the at least one first planetary gearset are arranged in the region of the first end portion of the housing. The first planetary gearset has a first element, second element and third element. The elements of the first planetary gearset have the form of sun gear, planet carrier and ring gear in particular. The first planetary gearset is formed as a negative planetary gearset in particular. A negative planetary gearset is comprised of the following elements: sun gear, planet carrier and ring gear. The planet carrier guides at least one planet gear, preferably a plurality of planet gears, so as to be rotatably supported, these planet gears meshing with the sun gear as well as with the surrounding ring gear. When two toothed wheels mesh with one another, they are in meshing engagement with one another.

By "shift element" is meant a device which has at least one open state and one closed state. In the open state, the device cannot transmit torque between two elements cooperating with this device or shift element. In the closed state, the device can transmit a torque between two elements cooperating with this device or shift element. A connection between two elements is provided to transmit torques and forces or a rotational movement from one gear unit element to the other gear unit element.

In particular, the first planetary gearset is adapted to be operatively connected to the electric machine in order to introduce a propulsive power of the electric machine into the gear unit. The first element of the first planetary gearset is connectable via the first shift element for co-rotation with a structural component of the gear unit fixed with respect to relative rotation. The first element of the first planetary gearset is connectable via the second shift element for co-rotation with the third element of the first planetary gearset. The second element of the first planetary gearset is adapted to route the propulsive power of the electric machine out of the first planetary gearset.

The first shift element and second shift element are adapted to realize a first gear speed and a second gear speed. The first gear speed is realized when the first shift element is in a closed state and the second shift element is in an open state. The second gear speed is realized when the first shift element is in an open state and the second shift element is in a closed state. Consequently, when the first shift element is closed, the first element of the first planetary gearset is secured in a stationary manner to the structural component of the gear unit fixed with respect to relative rotation, particularly braked at a housing cover. The first shift element is formed as a brake. When an element is secured, i.e., connected for co-rotation with a structural component of the gear unit which is fixed with respect to relative rotation, it is restrained against a rotational movement. The structural component of the gear unit which is fixed with respect to relative rotation can preferably be a permanently stationary component, preferably a housing of the gear unit, a portion of such a housing, or a housing cover which is connected to the housing of the gear unit so as to be fixed with respect to rotation relative to it.

In contrast, when the second shift element is closed, the first element of the first planetary gearset is connected for co-rotation with the third element of the first planetary gearset, and, in an open state of the second shift element, the first element of the first planetary gearset and the third element of the first planetary gearset can rotate relative to one another. Consequently, the second shift element is formed as a clutch. The two shift elements are preferably open in an unactuated state. The respective shift element preferably has a plurality of inner plates and outer plates. Consequently, the respective shift element is formed as a frictionally engaging shift element.

An electric drive system, according to one aspect of the invention, for a motor vehicle comprises a gear unit according to the invention and an electric machine. In particular, the electric machine is integrated in the housing in such a way that the gear unit and the electric machine together form the drive system of the motor vehicle. The stator of the electric machine is arranged at the housing so as to be fixed with respect to rotation relative to it. At least the first planetary gearset with the two shift elements is arranged at a first end face of the electric machine, and at least the differential gear is arranged at a second end face of the electric machine. Consequently, the motor vehicle is formed as an electric vehicle and comprises the gear unit according to the invention and the electric machine which together form the electric drive system.

BRIEF DESCRIPTION OF THE DRAWINGS

The invention will be described in more detail in the following referring to the drawings. The drawings show.

DETAILED OF THE PREFERRED EMBODIMENTS

Figure 1:
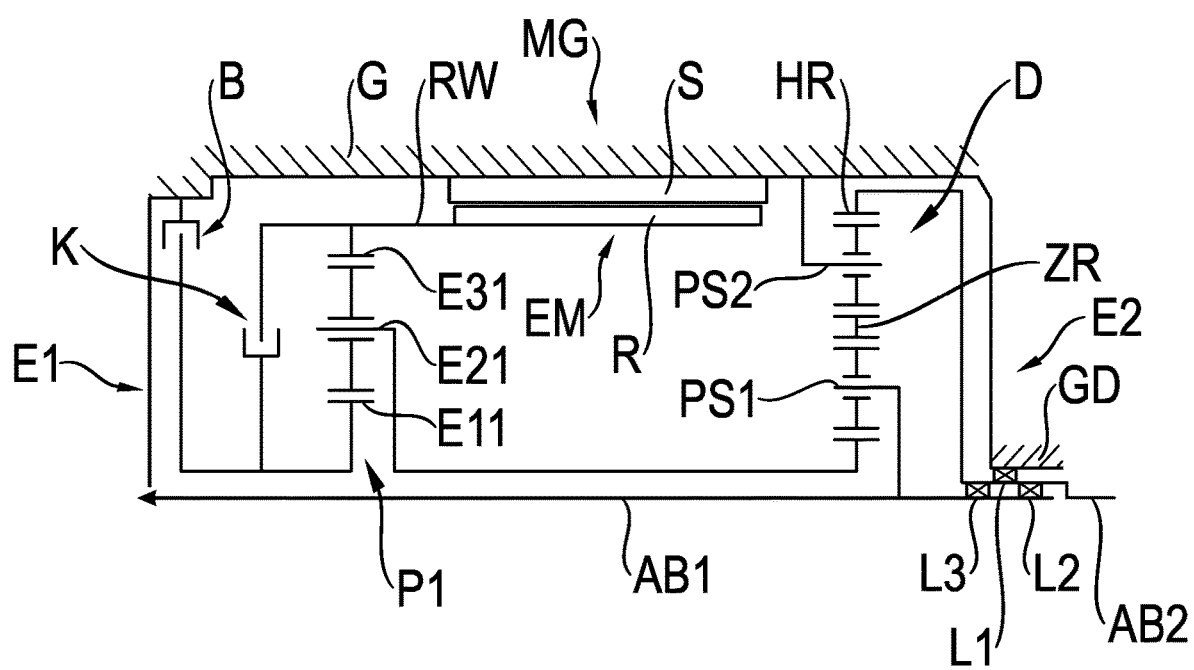
FIG. 1 is a highly simplified schematic diagram of an electric drive system of a motor vehicle, only one half of which is shown.

As is shown in FIG. 1, an electric drive system, according to the invention, for a motor vehicle has a gear unit G and an electric machine EM with a stator S and a rotor R, the gear unit G and the electric machine EM being arranged in a common housing GG. The gear unit G comprises a first planetary gearset P1, a differential gear D which is operatively connected to the first planetary gearset P1, and a first output shaft AB1 and second output shaft AB2 which are operatively connected to the differential gear D. The two output shafts AB1, AB2 are formed coaxial to the first planetary gearset P1 and the differential gear D, the first output shaft AB1 extending axially through the entirety of gear unit G. The housing GG has a middle portion MG, a first axial end portion E1 and a second axial end portion E2. The electric machine EM is arranged in the middle portion MG of the housing GG. The stator S is connected to the housing GG so as to be fixed with respect to rotation relative to it. The rotor R is rotationally movably arranged inside of the stator S. Differential gear D is arranged in the region of the second end portion E2 of the housing GG. Further, the first planetary gearset P1, a first shift element B and second shift element K are arranged in the region of the first end portion E1 of the housing GG. Consequently, the electric machine EM borders the first planetary gearset P1 on one end side and the differential gear D on the other end side. The rotor R is connected to the gear unit G via a rotor shaft RW.

The first planetary gearset is operatively connected on the input side to the electric machine EM and operatively connected on the output side to the differential gear D. In other words, a propulsive power of the electric machine EM is introduced into the gear unit G via the first planetary gearset P1 and then distributed to the two output shafts AB1, AB2 via the differential gear D. The first planetary gearset P1 has a first element E11, second element E21 and third element E31. Via the first shift element B, the first element E11 of the first planetary gearset P1 is connectable for co-rotation with a structural component of the gear unit G that is fixed with respect to relative rotation. In the present instance, the structural component of the gear unit G that is fixed with respect to relative rotation is formed as housing cover, the housing cover being connected to the housing GG so as to be fixed with respect to rotation relative to it. Via the second shift element K, the first element E11 of the first planetary gearset P1 is connectable for co-rotation with the third element E31 of the first planetary gearset P1. The second element E21 of the first planetary gearset P1 is formed as planet carrier and is adapted for output, there being rotatably supported at the second element E21 of the first planetary gearset P1 a plurality of planet gears which mesh, respectively, with the first element E11 of the first planetary gearset P1 and with the third element E31 of the first planetary gearset P1. The first element E11 of the first planetary gearset P1 is formed as sun gear, and the third element E31 of the first planetary gearset P1 is formed as ring gear. In the present instance, the second element E21 of the first planetary gearset P1 is connected for co-rotation with a sun gear SR of the differential gear D.

The first shift element B and the second shift element K are adapted to realize a first gear speed and second gear speed. The first gear speed is realized in a closed state of the first shift element B which is formed as a brake and an open state of the second shift element K which is formed as a clutch. The second gear speed is realized in an open state of the first shift element B and a closed state of the second shift element K. In the first gear speed, the third element E31 of the first planetary gearset P1 is adapted to introduce the propulsive power from the electric machine EM into the first planetary gearset P1. The first element E11 of the first planetary gearset P1 is connected via the first shift element B for co-rotation with the housing cover which is secured in a stationary manner. In contrast, the first element E11 and third element E31 of the first planetary gearset P1 are connected for co-rotation with one another in the second gear speed and are adapted to rotate as a block so that the propulsive power is introduced from the electric machine EM into the first planetary gearset P1. The two shift elements B, K are arranged inside of the first axial end portion E1 of the housing GG, and the differential gear D is arranged inside of the second axial end portion E2 of the housing GG.

In addition to the sun gear SR, the differential gear D has a ring gear HR, a first planet carrier PS1 and second planet carrier PS2 and an intermediate gear ZR. The intermediate gear ZR is formed as sun ring gear and is freely rotatable. A plurality of planet gears are rotatably supported at the first planet carrier PS1 and mesh, respectively, with the sun gear SR and with an inner toothing of the surrounding intermediate gear ZR. A plurality of planet gears are rotatably supported at the second planet carrier PS2 and mesh, respectively, with an outer toothing of the intermediate gear ZR and with the ring gear HR. The first planet carrier PS1 is connected to the first output shaft AB1 so as to be fixed with respect to rotation relative to it. The second planet carrier PS2 is connected to the housing GG of the gear unit G so as to be fixed with respect to rotation relative to it. Further, the ring gear HR is connected to the second output shaft AB2 so as to be fixed with respect to rotation relative to it.

Figure 2:
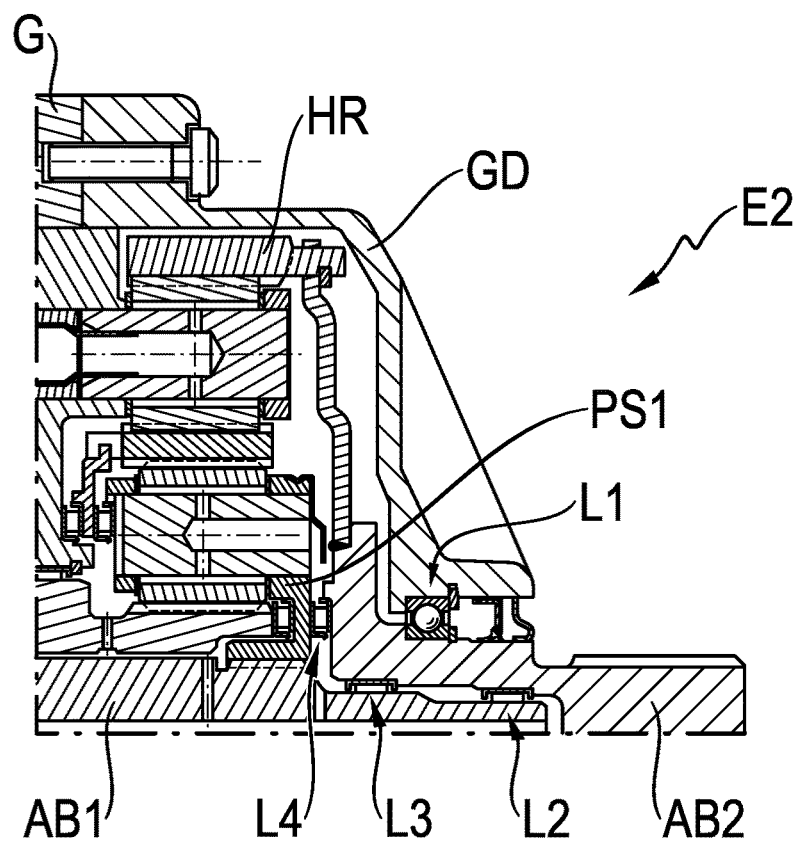
FIG. 2 is a schematic sectional view of a detail of the electric drive system according to FIG. 1.

FIG. 2 shows a detail from FIG. 1 in a sectional view. According to the FIG. 1 and FIG. 2, the second output shaft AB2 is partially formed as a hollow shaft, the first output shaft AB1 extending partially into the second output shaft AB2. An individual first bearing L1 is arranged radially between the second output shaft AB2 and a housing cover GD in the region of the second end portion E2 of the housing GG for the rotatable support of the second output shaft AB2. Further, a second bearing L2 and third bearing L3 for the rotatable support of the two output shafts AB1, AB2 are arranged radially between the first output shaft AB1 and second output shaft AB2. In the present case, the first bearing L1 is arranged in an area axially inside of the second bearing L2 and third bearing L3. When a radial force acts on the second output shaft AB2, the radial force is divided due to the arrangement of the three bearings L1, L2, L3 in such a way that a radial force component acting on the first bearing L1 is greater than that acting on the second bearing L2 and third bearing L3.

The sectional view in FIG. 2 reveals more detail than in FIG. 1. According to FIG. 2, the housing cover GD is axially screwed to the housing GG. The first bearing L1 is formed as a ball bearing. An outer race of the first bearing L1 is arranged at the housing cover GD so as to be fixed with respect to rotation relative to it, an inner race of the first bearing L1 is arranged at the second output shaft AB2 so as to be fixed with respect to rotation relative to it, and the rolling elements of the first bearing L1 roll between the outer race and the inner race. The first bearing L1 is axially secured by two retaining rings and sealed by sealing rings which are arranged radially between the housing cover GD and the second output shaft AB2. The second bearing L2 and third bearing L3 are formed, respectively, as needle cage and radially contact the first output shaft AB1 and second output shaft AB2. The first output shaft AB1 is connected to the first planet carrier PS1 so as to be fixed with respect to rotation relative to it. The second output shaft AB2 is connected to the ring gear HR so as to be fixed with respect to rotation relative to it. A fourth bearing L4 is arranged axially between the second output shaft AB2 and the first planet carrier PS1 for the rotatable support of the second output shaft AB2 relative to the first planet carrier PS1. The fourth bearing L4 is formed as needle cage and axially contacts the first planet carrier PS1 and second output shaft AB2.

Figure 3:
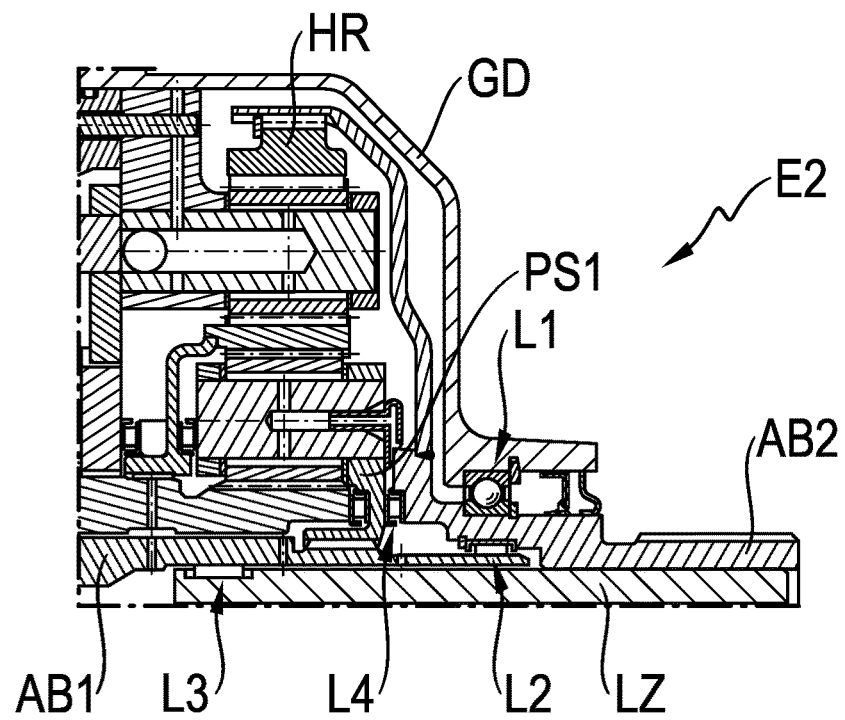
FIG. 3 is a schematic sectional view of a detail of the electric drive system.

A second embodiment form of the invention is shown in FIG. 3. According to FIG. 3, the first output shaft AB1 and the second output shaft AB2 are partially formed as hollow shafts. An individual first bearing L1 is arranged radially between the second output shaft AB2 and a housing cover GD in the region of the second end portion E2 of the housing GG for the rotatable support of the second output shaft AB2. Further, a second bearing L2 for the rotatable support of the two output shafts AB1, AB2 is arranged radially between the first output shaft AB1 and second output shaft AB2. A bearing journal LZ penetrates partially into the first output shaft AB1 and partially into the second output shaft AB2. The bearing journal LZ is connected to the second output shaft AB2 so as to be fixed with respect to rotation relative to it. A third bearing L3 is arranged radially between the first output shaft AB1 and the bearing journal LZ for the rotatable support of the first output shafts AB1 relative to the bearing journal LZ. The first bearing L1 and second bearing L2 are arranged so as to be radially stacked, the third bearing L3 being arranged in an area of the bearing journal LZ that is axially outside of the first bearing L1 and second bearing L2. In the present case, the third bearing L3 is arranged at an end region of the bearing journal LZ, the second bearing L2 being arranged at an end region of the first output shaft AB1 such that a maximum bearing base is made possible. When a radial force acts on the second output shaft AB2, the radial force is divided due to the arrangement of the three bearings L1, L2, L3 in such a way that a radial force component acting on the first bearing L1 and second bearing L2 is greater than that acting on the third bearing L3.

The first bearing L1 is formed as a ball bearing. An outer race of the first bearing L1 is arranged at the housing cover GD so as to be fixed with respect to rotation relative to it, an inner race of the first bearing L1 is arranged at the second output shaft AB2 so as to be fixed with respect to rotation relative to it, and the rolling elements of the first bearing L1 roll between the outer race and the inner race. The first bearing L1 is axially secured by two retaining rings and sealed by sealing rings which are arranged radially between the housing cover GD and the second output shaft AB2. The second bearing L2 and third bearing L3 are formed, respectively, as needle cage. The second bearing L2 radially contacts the first output shaft AB1 and second output shaft AB2. The first output shaft AB1 is connected to the first planet carrier PS1 so as to be fixed with respect to rotation relative to it. The second output shaft AB2 is connected to the ring gear HR so as to be fixed with respect to rotation relative to it. The third bearing L3 radially contacts the first output shaft AB1 and, in a circumferential groove, contacts the bearing journal LZ. The fourth bearing L4 is arranged axially between the second output shaft AB2 and the first planet carrier PS1 for the rotatable support of the second output shaft AB2 relative to the first planet carrier PS1. The fourth bearing L4 is formed as a needle cage and comes in axial contact with the first planet carrier PS1 and the second output shaft AB2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for an electric drive system of a motor vehicle, comprising:
    a housing having a middle portion, a first axial end portion, and second axial end portion, wherein the middle portion of the housing is configured to receive an electric machine;
    a first output shaft;
    a second output shaft arranged coaxially with respect to the first output shaft and at least partially formed as hollow shaft, the first output shaft at least partially extends into the second output shaft;
    at least one differential gear arranged in an area of the second axial end portion of the housing, the at least one differential gear is operatively connectable on a drive side directly or indirectly to an electric machine and is operatively connected on a driven side to the first output shaft and the second output shaft,
    wherein the at least one differential gear has a sun gear, a ring gear, a first planet carrier, a second planet carrier and an intermediate gear,
    wherein one of these elements of the differential gear is configured to introduce a propulsive power from the electric machine into the at least one differential gear, another one of these elements of the differential gear is connected to the first output shaft so as to be fixed with respect to rotation relative to it, another one of these elements of the differential gear is connected to co-rotate with a structural component of the gear unit that is fixed with respect to relative rotation and another one of these elements of the differential gear is connected to the second output shaft so as to be fixed with respect to rotation relative to it,
    an individual first bearing configured to rotatably support of the second output shaft is arranged radially between the second output shaft and a structural component of the gear unit that is fixed with respect to relative rotation; and at least one second bearing configured to rotatably support both of the two output shafts (AB1, AB2) is arranged radially between the first output shaft and second output shaft.

2. The gear unit according to claim 1, further comprising:
at least a third bearing configured to rotatably support the two output shafts and arranged radially between the first output shaft and second output shaft.

3. The gear unit according to claim 2, wherein the individual first bearing is arranged in an area axially inside of the at least one second bearing and the third bearing.

4. The gear unit according to claim 2, wherein the third bearing is a rolling element bearing or plain bearing.

5. The gear unit according to claim 1,
wherein a first output shaft is formed at least partially as hollow shaft,
wherein a bearing journal extends at least partially into the first output shaft and at least partially into the second output shaft,
wherein at least a third bearing configured to rotatably support of the first output shaft relative to the bearing journal is arranged radially between the first output shaft and the bearing journal,
wherein the bearing journal is connected to the second output shaft so as to be fixed with respect to rotation relative to it.

6. The gear unit according to claim 5, wherein the individual first bearing and at least one second bearing are arranged to be radially stacked, wherein the third bearing is arranged in a region of the bearing journal axially outside of the individual first bearing and at least one second bearing.

7. The gear unit according to claim 6, wherein the third bearing is arranged at an end region of the bearing journal.

8. The gear unit according to claim 1, wherein the individual first bearing is a ball bearing.

9. The gear unit according to claim 1, wherein the at least one second bearing is a rolling element bearing or a plain bearing.

10. The gear unit according to claim 1, wherein the structural component of the gear unit that is fixed with respect to relative rotation is a housing cover.

11. The gear unit according to claim 1,
wherein the sun gear of the at least one differential gear is configured to introduce a propulsive power from the electric machine into the at least one differential gear,
wherein the first planet carrier of the at least one differential gear is connected to the first output shaft so as to be fixed with respect to rotation relative to it,
wherein the second planet carrier of the at least one differential gear is connected to co-rotate with a structural component of the gear unit that is fixed with respect to relative rotation, and
wherein the ring gear of the at least one differential gear is connected to the second output shaft so as to be fixed with respect to rotation relative to it.

12. The gear unit according to claim 11, wherein a fourth bearing configured to rotatably support of the second output shaft relative to the first planet carrier is arranged axially between the second output shaft and the first planet carrier.

13. The gear unit according to claim 1, further comprising a first planetary gearset;
wherein the at least one differential gear is operatively connected on the drive side to the electric machine via the first planetary gearset.

14. The gear unit according to claim 13, further comprising:
a first shift element and a second shift element arranged in a region of the first axial end portion of the housing,
wherein the first planetary gearset is arranged in the region of the first axial end portion of the housing,
wherein the first planetary gearset has a first element, a second element, and a third element.

15. The gear unit according to claim 14,
wherein the first planetary gearset is configured to be operatively connected to the electric machine to introduce a propulsive power of the electric machine into the gear unit,
wherein the first element of the first planetary gearset is connectable via the first shift element for co-rotation with a structural component of the gear unit that is fixed with respect to relative rotation,
wherein the first element of the first planetary gearset is connectable via the second shift element for co-rotation with the third element of the first planetary gearset, and
wherein the second element of the first planetary gearset is adapted to route the propulsive power of the electric machine out of the first planetary gearset.

16. An electric drive system for a motor vehicle, comprising
an electric machine; and
a gear unit comprising:
a housing having a middle portion, a first axial end portion, and second axial end portion, wherein the middle portion of the housing is configured to receive the electric machine;
a first output shaft;
a second output shaft arranged coaxially with respect to the first output shaft and at least partially formed as hollow shaft, the first output shaft at least partially extends into the second output shaft;
at least one differential gear arranged in an area of the second axial end portion of the housing, the at least one differential gear is operatively connected on a drive side directly or indirectly to the electric machine and is operatively connected on a driven side to the first output shaft and the second output shaft,
wherein the at least one differential gear has a sun gear, a ring gear, a first planet carrier, a second planet carrier and an intermediate gear, wherein one of these elements of the differential gear is configured to introduce a propulsive power from the electric machine into the at least one differential gear, another one of these elements of the differential gear is connected to the first output shaft so as to be fixed with respect to rotation relative to it, another one of these elements of the differential gear is connected to co-rotate with a structural component of the gear unit that is fixed with respect to relative rotation and another one of these elements of the differential gear is connected to the second output shaft so as to be fixed with respect to rotation relative to it,
an individual first bearing configured to rotatably support of the second output shaft is arranged radially between the second output shaft and a structural component of the gear unit that is fixed with respect to relative rotation; and
at least one second bearing configured to rotatably support of the two output shafts is arranged radially between the first output shaft and second output shaft.

* * * * *